Dec. 29, 1953     D. F. HUSTON     2,663,949
TEMPLE MEASURE
Filed Aug. 2, 1948
*Fig. 1.*
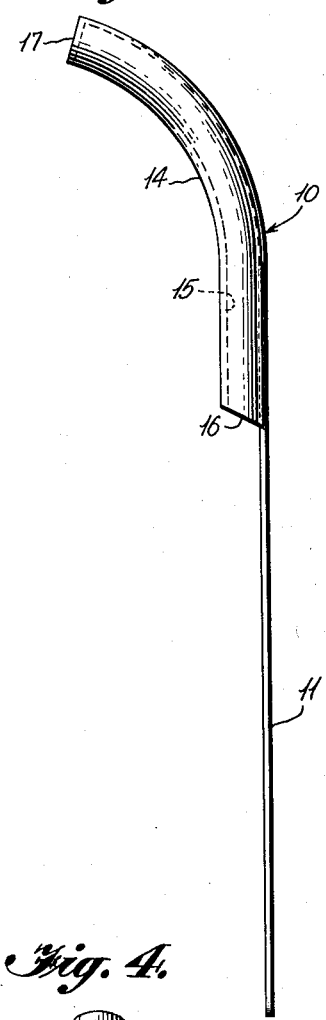
*Fig. 2.*    *Fig. 3.*
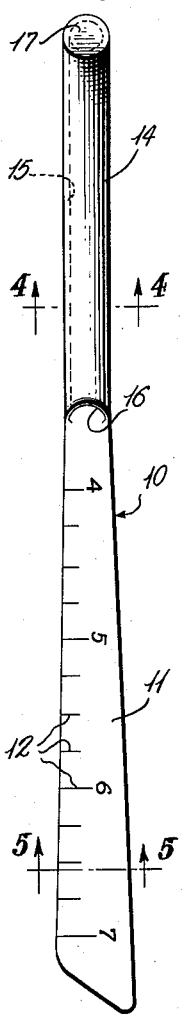 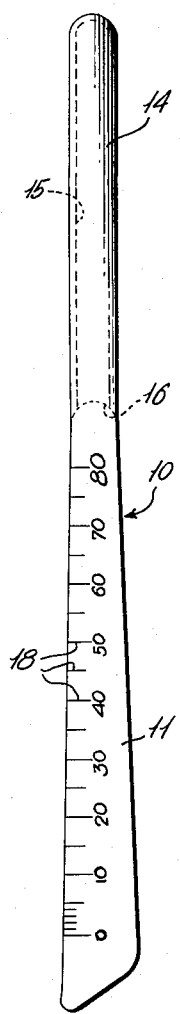
*Fig. 4.*
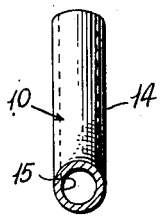
*Fig. 5.*
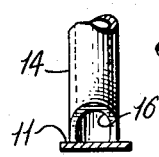
INVENTOR
*Daniel F. Huston*
BY *Mason, Fenwick & Lawrence*
ATTORNEYS Patented Dec. 29, 1953

2,663,949

UNITED STATES PATENT OFFICE 2,663,949

TEMPLE MEASURE

Daniel F. Huston, Burlington, Iowa

Application August 2, 1948, Serial No. 41,951

2 Claims. (Cl. 33—200)

The present invention relates in general to measuring instruments or rules adapted for use by opticians, optometrists and oculists, and more particularly to devices for measuring the temple pieces of spectacle or eyeglass frames.

The present invention is particularly adapted for use in determining the proper size of replacement temple pieces to be substituted for defective or injured temple pieces in eyeglass frames. Temple pieces in fitted eyeglass frames vary in size according to the head configuration of the person for whom the eyeglasses are designed, and in general correspond to the length of a line extending from the projected nose bridge of the user about the rear of the ear of the user. As this distance is subject to a rather wide range of variation, a wide range of temple piece sizes must be maintained by the optician for replacement and repair of defective eyeglass frames. Due to the curvature of the ear engaging portion of the temple piece, accurate measurement of the length from the hinge point to the tip of the ear engaging portion of the temple piece is exceedingly difficult on a straight rule.

Heretofore, several types of curved rules have been provided for facilitating this temple piece measuring operation, each of which provides a curved frame about which the curved ear engaging portion of the temple piece must be fitted and manually held, and which are provided with an extension scale for indicating opposite the hinge point of the temple piece the length of the temple piece. These devices, however, have proved to be rather inconvenient to handle, as it is generally very difficult to maintain the curved ear engaging portion of the temple piece disposed against and in exact conformity with the curved portion of the device while the straight portion of the temple piece is held against the flat scale to determine the length of the temple piece. This is primarily due to the fact that there is no true standard curvature for the curved ear engaging portion of the temple piece, and the temple piece generally must be deformed and held in the deformed condition to correspond to the curvature of the measuring device.

An object of the present invention, therefore, is the provision of a novel temple piece measuring device for eyeglass frames which is simple in construction, inexpensive to manufacture, and which is adapted to readily conform the shape of the temple piece to the shape of the measuring device to facilitate measuring the length of the temple piece.

Another object of the present invention is the provision of a novel temple piece device for eyeglass frames having improved means for effecting a measure of the distance from the hinge point of the temple piece to the tip of the curved ear engaging portion of the temple piece.

Another object of the present invention is the provision of a novel temple piece measuring device for eyeglass frames adapted to maintain the temple piece in conformity with a measuring scale to permit the operator to readily measure the length of the temple piece with greater ease and less manual manipulation of the temple piece.

Other objects, advantages, and capabilities of the present invention will become apparent from the following detailed description taken in conjunction with the accompanying drawing, wherein only a preferred embodiment of the invention is shown.

In the drawings:

Figure 1 is a side elevation of a temple piece measuring device for eyeglass frames embodying the present invention;

Figure 2 is a front elevation of the improved measuring device;

Figure 3 is a rear elevation of the improved measuring device;

Figure 4 is a transverse sectional view taken along the lines 4—4 of Figure 2, illustrating the cross sectional configuration of the curved portion of the instant device; and Figure 5 is a transverse section taken along the lines 5—5 of Figure 2, illustrating the cross sectional configuration of the straight portion of the instant device bearing the measuring scale.

Referring to the drawing wherein like reference characters refer to corresponding parts throughout the several figures, the numeral 10 designates generally the improved rule or measuring device embodying the present invention, which is formed of a single strip of suitable material, such as sheet metal or plastic, having a straight flat blade portion, indicated at 11. The blade portion on its front surface, as viewed in Figure 2, carries a measuring scale, indicated at 12, in inches, etched or otherwise suitably impressed on the surface of the blade 11.

Extending from one end of the blade portion 11 adjacent the lower portion of the scale 12 is a tubular curved portion 14 constituting a horn or crook, having a central bore 15 extending throughout the length thereof and opening at its inner end at 16 adjacent the blade 11. The remote end of the bore 15 in the horn 14 is closed, is indicated at 17 and forms a zero reference point for the calibrated scale of the blade 11.

In the illustrated embodiment a metric scale, indicated at 18, is etched or suitably impressed on the rear surface, shown in Figure 3, of the blade 11, starting from a zero reference point adjacent the outer tip of the blade 11.

The instant improved measuring device is to be used substantially as follows:

The improved measuring device may be conveniently employed for measuring the length of eyeglass frame temple pieces either before or after the temple piece is coupled to the remainder of the eyeglass frame. To measure the length of the temple piece, the operator need only insert the tip of the curved ear engaging portion of the temple piece into the opening 16 of the bore 15 in the horn 14 and force the temple piece along the bore until the tip of the curved portion thereof engages the closed end 17 of the horn 14. The curvature of the horn portion 14, as illustrated in the drawing, is of a greater radius than that of the usual ear engaging curved portion of eyeglass frame temple pieces of the conventional ear-encircling type. The end of the temple piece will therefore be slightly deformed or sprung by the bore 15 of the tubular horn 14, serving to frictionally maintain the temple piece within the horn with its end abutting the closed end 17 of the horn 14. By merely pressing the shank or straight portion of the temple piece against the blade 11 carrying the calibrated scale 12, the length of the temple piece can be readily read off of the scale 12 at the hinge point of the temple piece.

The metric scale 18 impressed on the rear surface of the blade portion 11 serves no purpose in connection with measurement of the eyeglass frame temple piece, but is merely provided as a convenience in measuring the interpupillary distance of the person being fitted with eyeglasses, and for making such other measurements as in the eyeglass fitting arts are commonly recorded in metric units.

With this improved measuring device, the operator is freed of any necessity of using one of his hands to maintain the curved ear engaging portion of the temple piece in substantial correspondence throughout with the curved portion of the measuring device, this function being entirely performed by the bore of the tubular horn 14. Therefore, only two fingers are required to press the shank of the temple piece against the blade 12 and effect an accurate measurement of the temple piece length. It will be readily apparent, therefore, that an improved and novel measuring device for eyeglass frame temple pieces has been provided which is extremely simple in construction and inexpensive to manufacture, which is extremely convenient to use, and which is highly effective to maintain the curved eyeglass frame temple piece in conformity with the calibrated scale on the measuring device to facilitate measuring the length of the device.

While only one embodiment of the present invention has been shown and described, it is distinctly understood that the invention is not limited thereto, but that various modifications may be made in the invention without departing from the spirit and scope thereof, and it is desired, therefore, that only such limitations shall be placed thereon as are imposed by the prior art and are set forth in the appended claims.

I claim:

1. A rule for measuring eyeglass temple pieces comprising a single integral length of material having a curved tubular horn element formed of one end of the length of the material to receive and retain an ear engaging curved portion of an eyeglass temple piece of the conventional ear-encircling type and a flat blade element formed of the other end of the material extending from and in continuation of the horn element, said blade element being provided with a measuring scale and said curved horn tubular element having a substantially coaxial bore formed with a closure member at an end of said horn element remote from said blade element, the scale on said blade element having linear indications thereon corresponding to the linear distance from a zero reference point coincident with said closure member, said curved tubular horn element having a large radius of curvature relative to that of the curved portion of eye glass temple pieces to frictionally retain the temple piece in full inserted relation within the horn element with the tip of the ear engaging portion of the temple piece abutting said closure member by deforming the curved portion of the temple piece relative to its normal curved state.

2. A temple piece measuring device for use by opticians comprising an integral length of material having a curved tubular portion forming a horn element to receive and retain an ear engaging curved portion of an eyeglass temple piece of the conventional ear-encircling type and a flat colinear extension thereof forming a blade element, said horn element having a bore extending therethrough substantially coaxial with said curved tubular portion and having a bore closure at the end of said curved tubular portion remote from said blade element, said blade element having a calibrated scale disposed thereon indicating linear distance from a zero reference point coincident with said bore closure, whereby insertion of the curved ear engaging portion of a spectacle temple piece within said bore in engagement with said bore closure will dispose the end of the temple piece extending outwardly of said bore in alignment with a scale indicating its rectilinear length equivalent, said curved tubular portion having a large radius of curvature relative to the curvature of spectacle temple pieces to deform the curved portion of temple pieces inserted therein relative to their normal curved state for frictionally retaining the temple pieces in full inserted relation therein.

DANIEL F. HUSTON.

References Cited in the file of this patent

UNITED STATES PATENTS

| Number | Name | Date |
|---|---|---|
| 987,315 | Nero | Mar. 21, 1911 |
| 1,480,584 | Wilhite | Jan. 15, 1924 |